US009638108B2

(12) United States Patent
Khan et al.

(10) Patent No.: US 9,638,108 B2
(45) Date of Patent: May 2, 2017

(54) SECTOR GEAR WITH INTEGRATED BUSHING

(71) Applicant: Continental Automotive Systems, Inc., Auburn Hills, MI (US)

(72) Inventors: Mohammed Rizwan Khan, Chatham (CA); Don Taylor, Chatham (CA)

(73) Assignee: Continental Automotive Systems, Inc., Auburn Hills, MI (US)

( * ) Notice: Subject to any disclaimer, the term of this patent is extended or adjusted under 35 U.S.C. 154(b) by 223 days.

(21) Appl. No.: 14/073,147

(22) Filed: Nov. 6, 2013

(65) Prior Publication Data

US 2014/0144407 A1    May 29, 2014

Related U.S. Application Data

(60) Provisional application No. 61/730,279, filed on Nov. 27, 2012.

(51) Int. Cl.
| | | |
|---|---|---|
| *F16H 55/02* | (2006.01) | |
| *F02D 9/10* | (2006.01) | |
| *F16K 31/53* | (2006.01) | |
| *F16K 1/22* | (2006.01) | |

(52) U.S. Cl.
CPC ......... *F02D 9/1065* (2013.01); *F02D 9/1035* (2013.01); *F16K 1/221* (2013.01); *F16K 31/535* (2013.01); *F02D 9/106* (2013.01); *Y10T 74/19874* (2015.01)

(58) Field of Classification Search
CPC ........ F02D 9/1065; F02D 9/107; F02D 11/10; F02D 11/105; F02D 9/1035; F02D 9/106; F16K 1/221; F16K 31/535; Y10T 74/19874

USPC .............................. 123/337, 399, 195 R, 319
See application file for complete search history.

(56) References Cited

U.S. PATENT DOCUMENTS

| | | | | |
|---|---|---|---|---|
| 3,539,148 A | * | 11/1970 | Boos, Jr. .................... | 251/129.2 |
| 3,591,127 A | * | 7/1971 | Luger et al. .................... | 251/36 |
| 5,797,589 A | * | 8/1998 | Kalebjian ............. | F16K 1/2268 |
| | | | | 123/337 |
| 6,039,027 A | * | 3/2000 | Sato et al. .................... | 123/399 |
| 6,244,565 B1 | * | 6/2001 | McDonnell et al. .... | 251/129.12 |

(Continued)

FOREIGN PATENT DOCUMENTS

| | | |
|---|---|---|
| CN | 101725415 A | 6/2010 |
| EP | 1375869 A2 | 1/2004 |
| WO | 00/68555 A1 | 11/2000 |

OTHER PUBLICATIONS https://en.oxforddictionaries.com/definition/us/bushing—Oxford Living Dicitonaries, Dec. 19, 2016.*

(Continued)

*Primary Examiner* — Thomas Moulis
*Assistant Examiner* — Susan Scharpf

(57) ABSTRACT

A throttle body having an integrated sector gear which includes a sector gear component, a bushing integrally formed with the sector gear component such that the bushing and sector gear component are a single part, and an insert, where the bushing and the sector gear formed around the insert. The insert includes a first arm and a second arm, and the insert is configurable to be formed with the sector gear and the bushing to be suitable for use with one or more packaging requirements of the throttle body.

22 Claims, 6 Drawing Sheets

(56) References Cited

U.S. PATENT DOCUMENTS

| | | | |
|---|---|---|---|
| 6,267,352 B1* | 7/2001 | Semeyn, Jr. ............. | F02D 9/02 123/339.15 |
| 6,659,050 B1* | 12/2003 | Creech .................... | F01P 7/167 123/41.08 |
| 6,683,429 B2* | 1/2004 | Pringle .................... | G05G 5/05 123/361 |
| 6,945,228 B2* | 9/2005 | Saito ..................... | F02D 9/1065 123/361 |
| 7,536,991 B2* | 5/2009 | Kadam et al. ................ | 123/337 |
| 7,536,993 B2* | 5/2009 | Tsukiji .................. | F02D 9/1065 123/361 |
| 2004/0089266 A1 | 5/2004 | Kawai et al. | |
| 2004/0129252 A1 | 7/2004 | Wayama et al. | |
| 2006/0157027 A1 | 7/2006 | Ichikawa et al. | |
| 2010/0095930 A1 | 4/2010 | Wong | |
| 2011/0056460 A1* | 3/2011 | Kondo .................. | F02D 9/1065 123/337 |
| 2012/0097129 A1* | 4/2012 | Damasceno et al. ......... | 123/337 |
| 2012/0291751 A1 | 11/2012 | Kurita et al. | |

OTHER PUBLICATIONS http://web.archive.org/web/20090910094914/http://en.wiktionary.org/wiki/bushing—Wiktionary.org, Sep. 10, 2009.*

* cited by examiner

SECTOR GEAR WITH INTEGRATED BUSHING

CROSS-REFERENCE TO RELATED APPLICATIONS

This application claims the benefit of U.S. Provisional Application No. 61/730,279 filed Nov. 27, 2012. The disclosure of the above application is incorporated herein by reference.

FIELD OF THE INVENTION

The invention relates generally to a sector gear used a part of a throttle body assembly, where the sector gear is integrated with a bushing and used to secure other components of the throttle body assembly together.

BACKGROUND OF THE INVENTION

Throttle bodies are commonly used with internal combustion engines in various types of vehicles for controlling the amount of air which flows into the engine during the operation of the engine. Throttle bodies of various sizes are used on different sized engines for controlling air flow.

A typical throttle body includes a housing with at least one passage for allowing air to flow through. Disposed within the passage is a valve used for controlling the air flow. The position of the valve is typically controlled by a motor which is used to position the valve between an open position, a closed position, and any position therebetween. Rotational force is transferred from the motor to operate the valve.

However, some of the components used to construct the throttle body increase the cost of assembly of the throttle body. Therefore, there exists a need for educing the number of components used to construct the throttle body, as well as reducing the cost.

SUMMARY OF THE INVENTION

The present invention is an integrally formed sector gear and bushing, which are both integrally formed around an insert. The insert is mounted to a shaft, and the sector gear is part of a gear box used to rotate the shaft, and change a valve in the valve body between an open position and a closed position.

In one embodiment, the present invention includes a sector gear; a bushing integrally formed with the sector gear such that the bushing and sector gear area single component, and an insert, where the bushing and the sector gear formed around the insert. The insert includes a first arm and a second arm, and the insert is configurable to be formed with the sector gear and the bushing to be suitable for use with one or more packaging requirements of a throttle body.

Connected to the throttle body is a gear box having a plurality of gears, and the sector gear is part of the plurality of gears and located in the gear box. The throttle body also includes a housing portion, a port formed as part of the housing portion, and a shaft extending through the housing portion such that a portion of the shaft is disposed in the port. A portion of the shaft is connected to and rotated by at least one of the plurality of gears. A valve is mounted to the shaft such that the valve is disposed in the port, and the plurality of gears are used for rotating the shaft and changing the valve between an open position, a closed position, and any position there between.

The sector gear includes a first section where material has been removed, and a second section where material has been removed. Each of the first arm and the second arm extend through one of the first section or the second section when the insert is formed with the sector gear and the bushing. The sector gear and the insert are configurable between a right-hand configuration and a left-hand configuration, depending upon the packaging requirements of the throttle body. The first arm extends through the first section and the second arm extends through the second section when the insert and the sector gear are configured in the left-hand configuration. The first arm extends through the second section, and the second arm extends through the first section when the insert and the sector gear are configured in the right-hand configuration.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
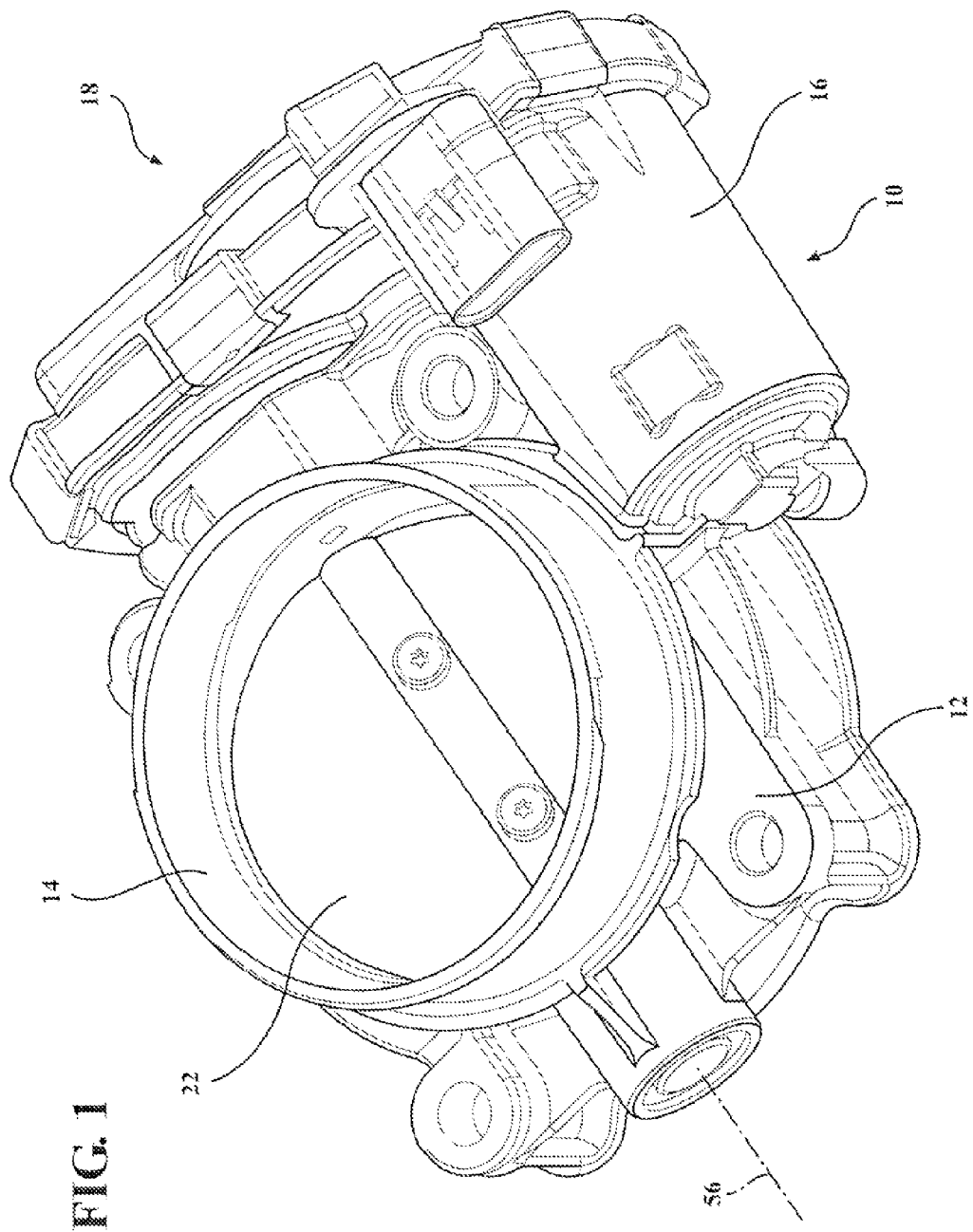
FIG. 1 is a perspective view of a throttle body having a left-hand configuration, according to embodiments of the present invention.

A throttle body having an integrated sector gear according to the present invention is shown in FIG. 1, generally at 10. The throttle body 10 includes a housing portion 12 having a port 14, which allows air to flow through. Connected to the housing portion 12 is an actuator, which in this embodiment is an electric motor 16. The electric motor 16 is connected to a gear box, shown generally at 18. The gear box 18 is mechanically connected to a shaft 20, which extends through the housing portion 12. A valve is mounted to the shaft 20 such that the valve is disposed in the port 14. More specifically, the valve in this embodiment is a valve plate 22 which is moveable between an open position, a closed position, and any position therebetween.

The shaft 20 extends out of the housing portion 12 and into the gear box 18. Disposed within the gear box 18 is a plurality of gears. At least one of the plurality of gears is mounted on an end of the shaft 20. More specifically, there is a sector gear 24 mounted on an end portion, shown generally at 26, of the shaft 20. The shaft 20 extends through a bearing boss 28 formed as part of the housing portion 12. The bearing boss 28 surrounds a bearing 30 which allows the shaft 20 to rotate relative to the bearing boss 28 and the housing portion 12.

The sector gear 24 includes a bushing 32 integrally formed as part of the sector gear 24, such that the sector gear 24 and the bushing 32 are formed as a single component. The sector gear 24 also includes an insert 34 having an aperture 36, through which the shaft 20 extends, as shown in FIGS. 2-3 and 5-6. The shaft 20, sector gear 24, bushing 32, and insert 34 all rotate about an axis 56. Formed as part of the sector gear 24 is a gear section 38, which is driven for rotation by a corresponding gear connected to and driven by the motor 16. The gear 24 also includes two sections where material has been removed. There is a first section 40 and a second section 42, best seen in FIGS. 3 and 6, and the first section 40 is located along the same portion of the sector gear 24 as the gear section 38. The insert 34 is made of metal, such as, but not limited to, steel or aluminum, and the bushing 32 and sector gear 24 are integrally formed together to surround the insert 34 during the manufacturing process.

Figure 2:
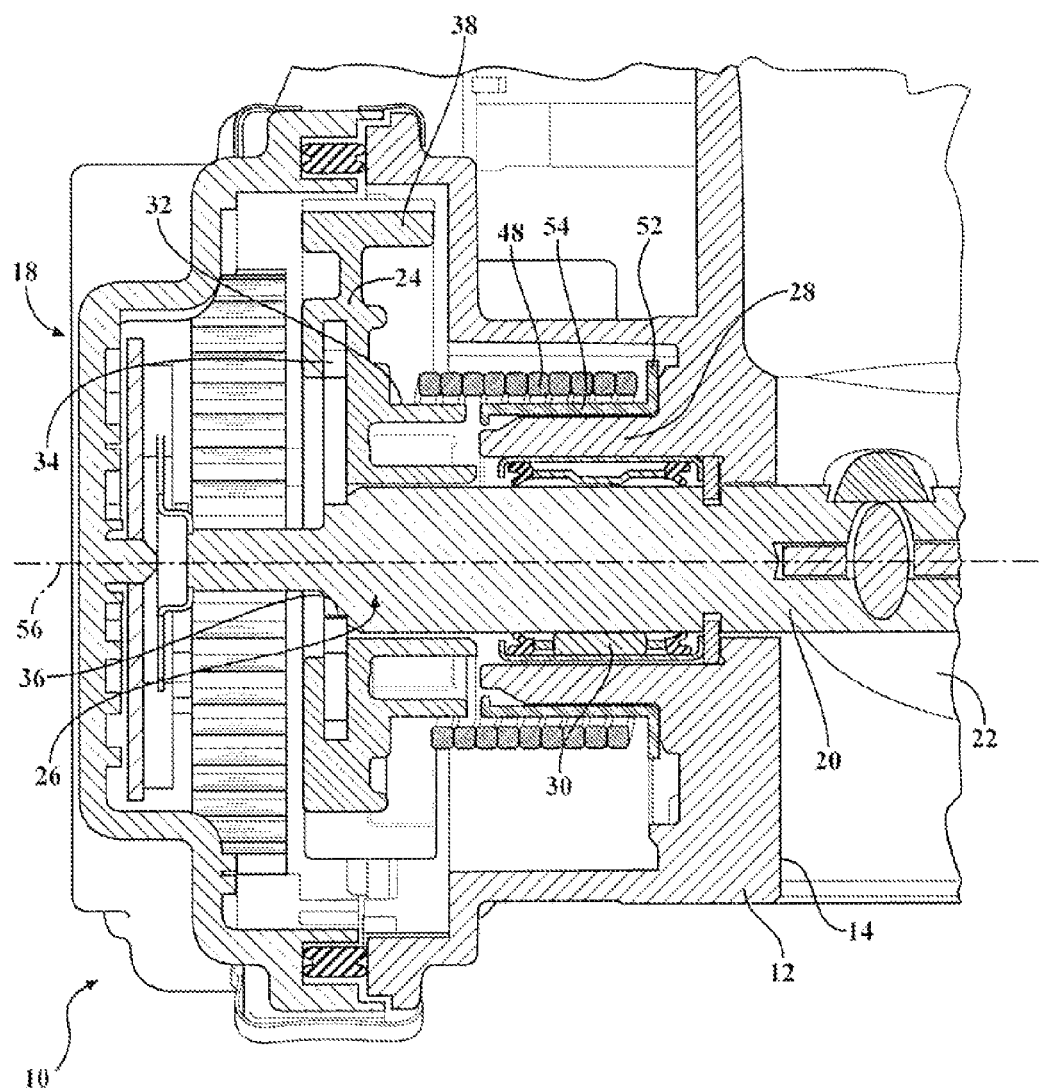
FIG. 2 is a sectional view of a throttle body having a left-hand configuration, according to embodiments of the present invention.
Figure 3:
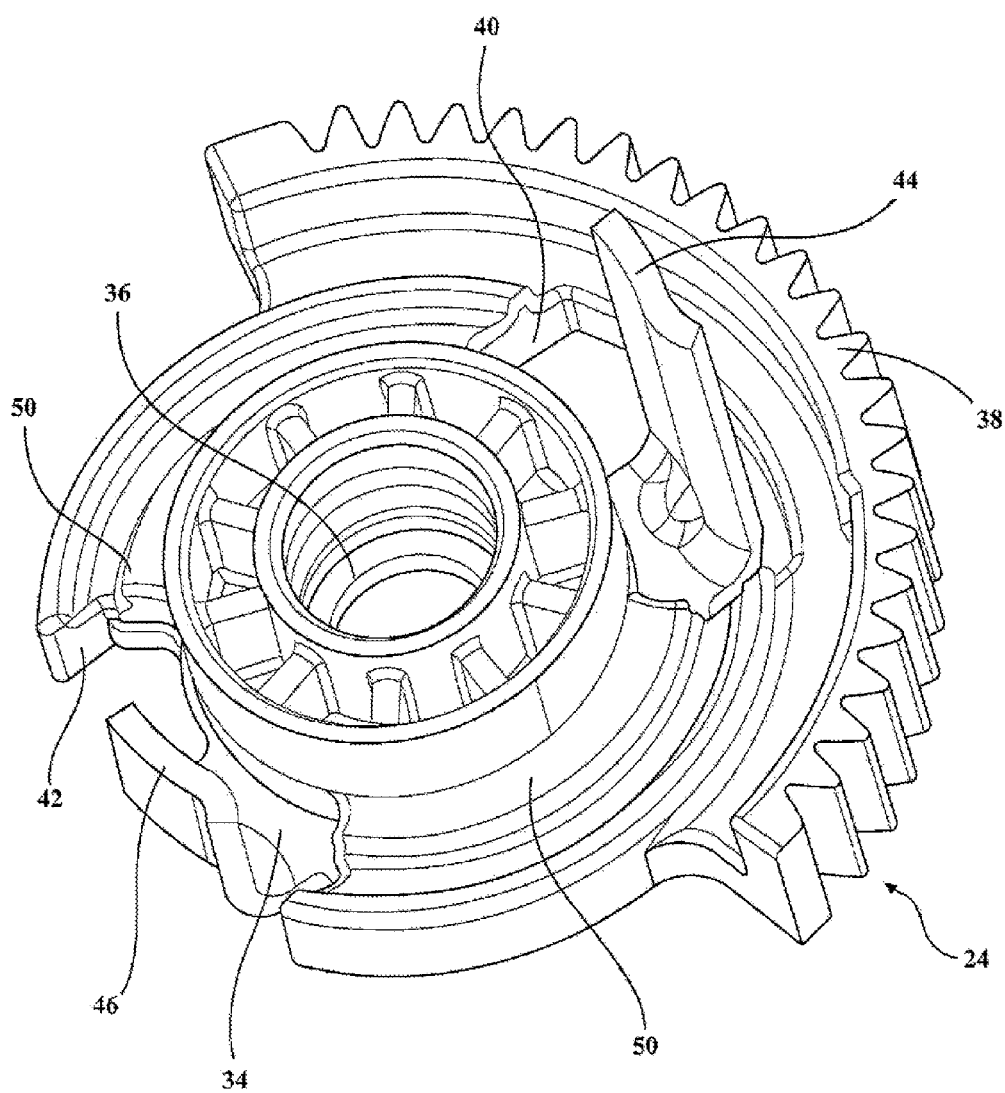
FIG. 3 is a perspective view of a sector gear having a left-hand configuration, according to embodiments of the present invention.

The insert also includes a first arm 44 and a second arm 46. In the embodiments shown in the Figures, the first arm 44 is longer than the second arm 46, but it is within the scope of the invention that other lengths of each arm 44,46 may be used. Each arm 44,46 extends substantially parallel to the axis 56. In FIGS. 2-3, the first arm 44 extends through the first section 40, and the second arm 46 extends through the second section 42. Each of the arms 44,46 partially surround a spring 48, and the spring 48 is located between, and contacts, a ridge 50 formed as part of the sector gear 24, and an inner flange 52 formed as part of a second bushing 54. The spring 48 also partially surrounds the bushing 32, and the bushing 32 functions to prevent the spring 48 from touching the shaft 20.

During operation, the motor 16 drives and therefore rotates the plurality of gears, one of which is the sector gear 24, which in turn rotates the shaft 20 and the valve plate 22, until the valve plate 22 is in a desired position. The position of the valve plate 22 controls the air flow through the port 14. Various engines have different packaging restrictions, and the motor 16 and gear box 18 may be oriented differently relative to the housing portion 12 to compensate for these different packaging restrictions. In the embodiment shown in FIGS. 1-3, the throttle body 10, and more specifically, the motor 16 and gear box 18, are configured as a "left-hand" motor 16 and gear box 18 combination. The sector gear 24 is also configured as a "left-hand" sector gear 24 in FIGS. 2 and 3, where the first arm 44 extends through the first section 40, and the second arm 46 extends through the second section 42.

Figure 4:
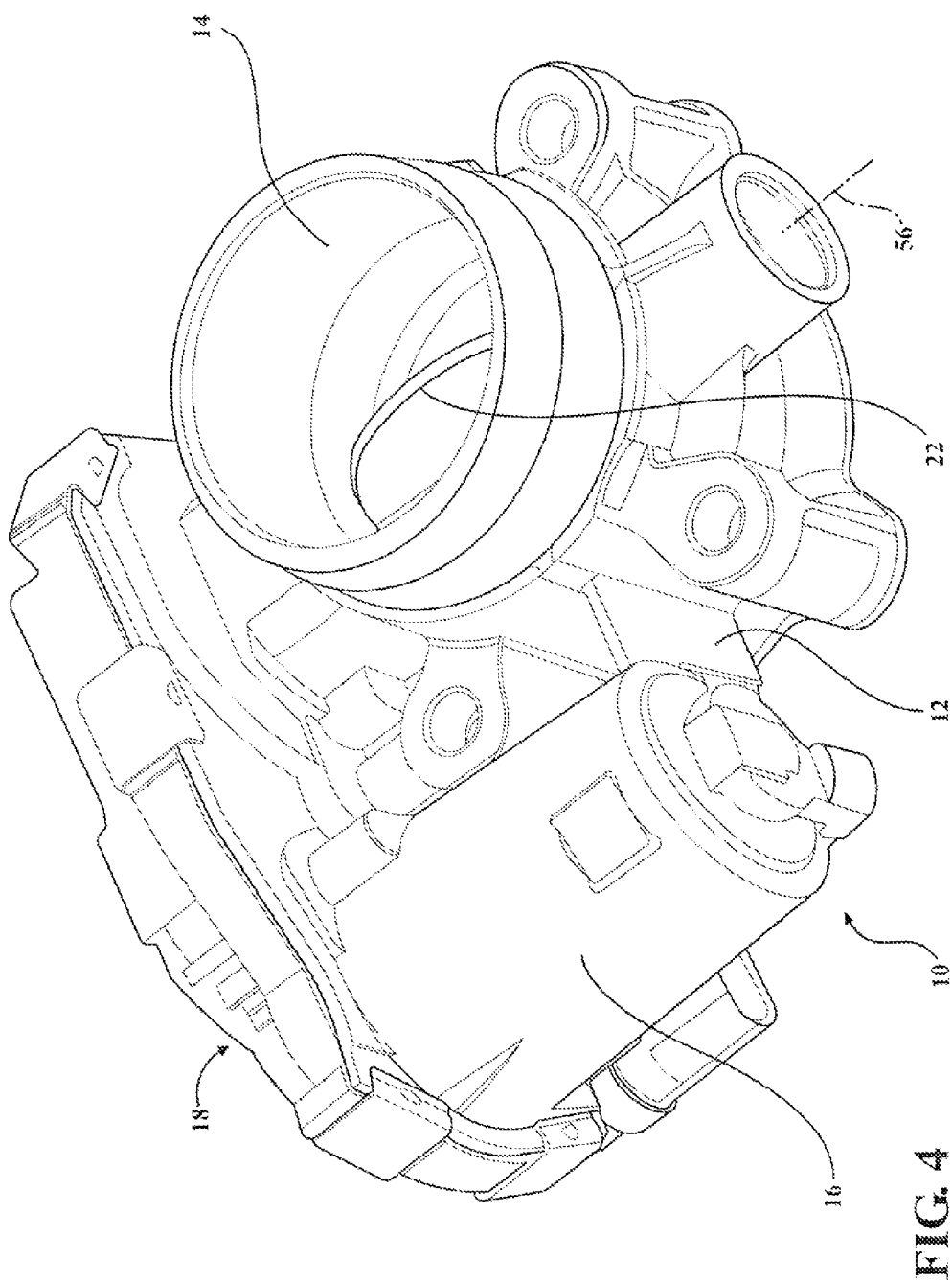
FIG. 4 is a perspective view of a throttle body having a right-hand configuration, according to embodiments of the present invention.
Figure 5:
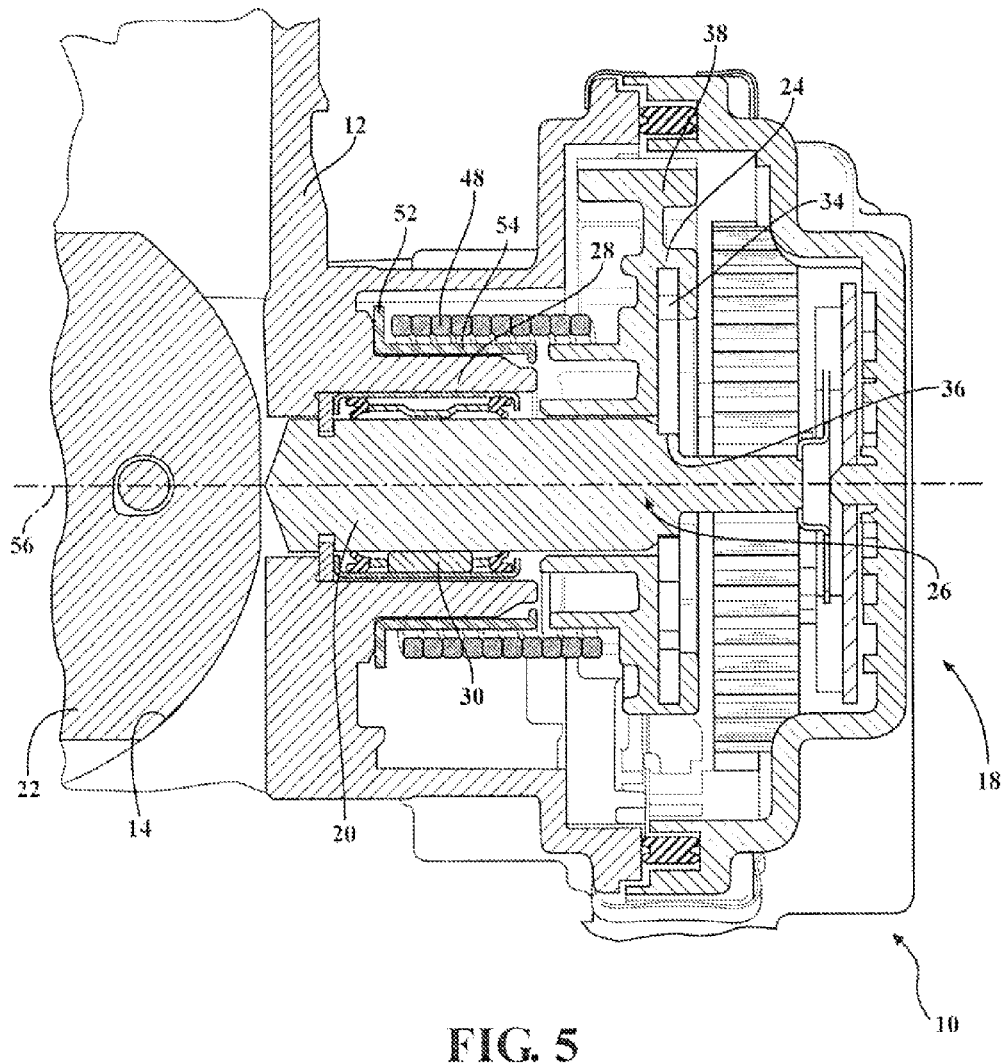
FIG. 5 is a sectional view of a throttle body having a right-hand configuration, according to embodiments of the present invention.
Figure 6:
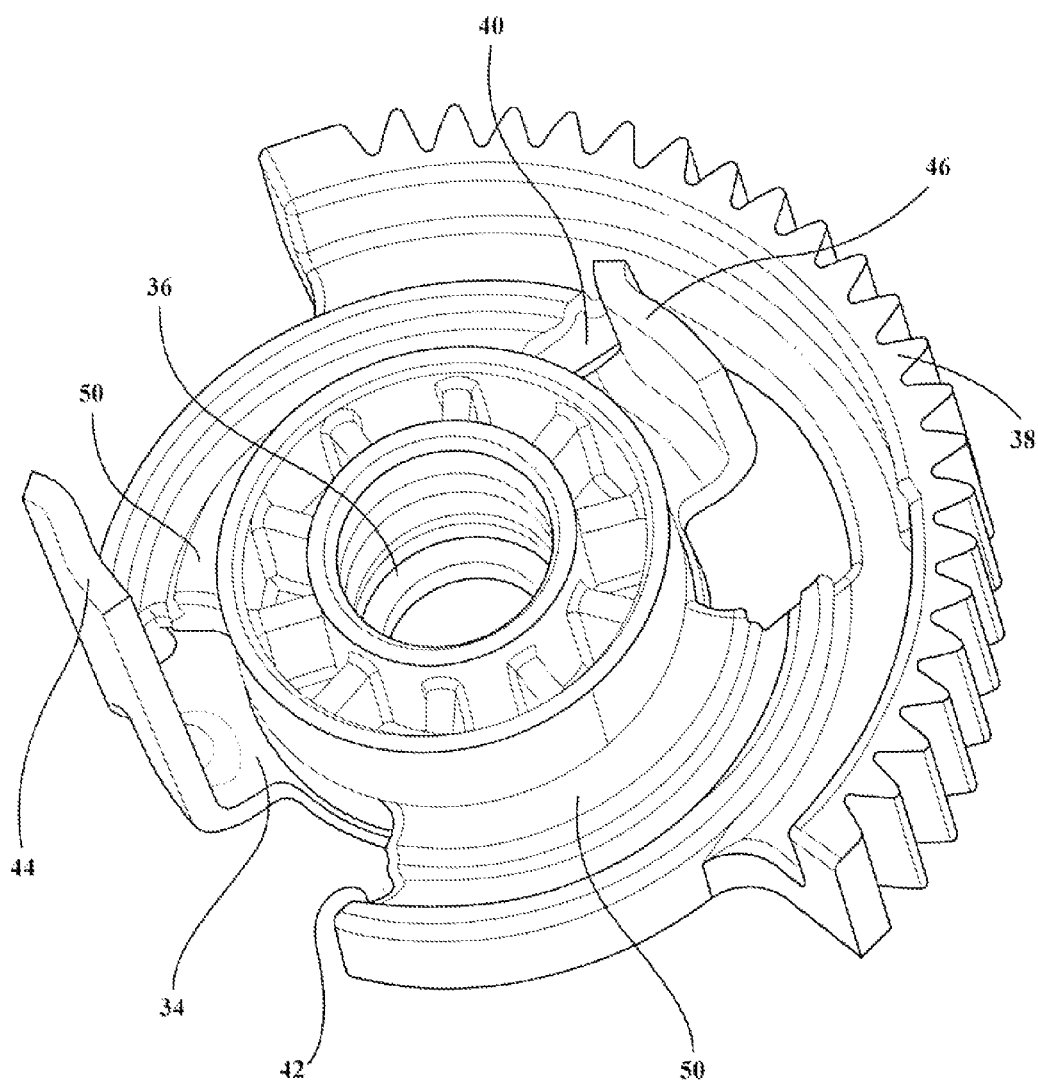
FIG. 6 is a perspective view of a sector gear having a right-hand configuration, according to embodiments of the present invention.

The throttle body 10 is also configurable as a "right-hand" throttle body 10, such that the motor 16 and gear box 18 are configured as a "right-hand" gear box, as shown in FIGS. 4-6. In this embodiment, the integrally formed sector gear 24 and bushing 32 is a "right-hand" sector gear 24 and bushing 32 combination. The sector gear 24 for the right-hand configuration is substantially the same shape the sector gear 24 for the left-hand configuration. The insert 34 is also substantially the same shape for both the right-hand configuration and the left-hand configuration. However, the position of the insert 34 relative to the sector gear 24 shown in FIGS. 5-6 is different than the position of the insert 34 relative to the sector gear 24 as shown in FIGS. 2-3.

In FIGS. 5-6, the insert 34 is rotated 180° relative to the position of the insert 34 shown in FIGS. 2-3, and is positioned such that the first arm 44 extends through the second section 42, and the second arm 46 extends through first section 40. This allows for the insert 34 and the integrally formed sector gear 24 and bushing 32 to be oriented for the right-hand configuration, and therefore allows the throttle body 10 to accommodate various engine packaging requirements.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   a sector gear component, including:
   a gear member;
   a first bushing integrally formed with the gear member;
   an insert, a portion of the gear member integrally formed around at least two surfaces of the insert;
   a shaft, the insert mounted on the shaft such that the shaft rotates as the gear member, the first bushing, and the insert are rotated;
   a ridge integrally formed with the gear member, the ridge substantially circumscribing the first bushing, the outer diameter of the ridge being larger than the outer diameter of the first bushing;
   a groove integrally formed with the gear member such that the ridge is substantially circumscribed by the groove;
   a spring in contact with the ridge formed as part of the gear member;
   a second bushing, the spring in contact with a portion of the second bushing; and
   a bearing boss, the second bushing mounted to the bearing boss;
   wherein the spring partially surrounds the first bushing and partially surrounds the second bushing, the portion of the gear member is formed around the insert such that the sector gear component is in a right-hand configuration or a left-hand configuration, and the position of the insert relative to the first bushing in the right-hand configuration is different than the position of the insert relative to the first bushing in the left-hand configuration.

2. The apparatus of claim 1, wherein the sector gear component is mounted within a throttle body.

3. The apparatus of claim 2, the throttle body further comprising:
   a housing portion, the bearing boss integrally formed as part of the housing portion;
   a port formed as part of the housing portion; and
   a valve disposed in the port;
   wherein the valve is connected to the sector gear component such that the sector gear component is used to change the valve between an open position and a closed position.

4. The apparatus of claim 3, the throttle body further comprising:
   wherein the shaft disposed in the housing such that a portion of the shaft extends into the port, and
   the valve is mounted to the shaft, and the shaft moves the valve between the open position and the closed position.

5. The apparatus of claim 4, the valve further comprising a plate, the plate mounted on the shaft such that the plate is disposed in the port.

6. The apparatus of claim 2, the throttle body further comprising:
a gear box connected to the housing portion; and
a plurality of gears disposed in the gearbox, the sector gear component being one of the plurality of gears;
wherein the plurality of gears are used for rotating the shaft and changing the valve between an open position, a closed position, and any position there between.

7. The apparatus of claim 1, further comprising:
a first arm formed as part of the insert; and
a second arm formed as part of the insert;
wherein the first arm and the second arm are parallel to an axis of rotation of the sector gear component.

8. The apparatus of claim 7, further comprising:
a first section formed as part of the gear member; and
a second section formed as part of the gear member;
wherein each of the first arm and the second arm extend through one of the first section or the second section when the insert is formed with the sector gear and the first bushing.

9. The apparatus of claim 8, wherein the first arm extends through the first section, and the second arm extends through the second section when the insert and the sector gear are in the left-hand configuration.

10. The apparatus of claim 8, wherein the first arm extends through the second section, and the second arm extends through the first section when the insert and the sector gear are in the right-hand configuration.

11. The apparatus of claim 7, wherein the second arm is shorter than the first arm.

12. An integrally formed sector gear, comprising:
a sector gear;
a first bushing integrally formed with the sector gear;
an insert, the first bushing and the sector gear integrally formed around at least two surfaces of the insert;
a ridge integrally formed with the gear member, the ridge substantially circumscribing the first bushing, the outer diameter of the ridge being larger than the outer diameter of the first bushing;
a groove integrally formed with the gear member such that the ridge is substantially circumscribed by the groove;
a spring in contact with the ridge formed as part of the gear member;
a second bushing, the spring in contact with a portion of the second bushing;
a bearing boss, the second bushing mounted to the bearing boss;
a first arm formed as part of the insert;
a second arm formed as part of the insert; and
a shaft, the insert mounted on the shaft such that the shaft rotates as the sector gear, the first bushing, and the insert are rotated;
wherein the spring partially surrounds the first bushing and partially surrounds the second bushing, the sector gear and the first bushing are formed around the insert in a right-hand configuration or a left hand configuration to be suitable for use with one or more packaging requirements, and the position of the insert relative to the first bushing in the right-hand configuration is different than the position of the insert relative to the first bushing in the left-hand configuration.

13. The integrally formed sector gear of claim 12, further comprising:

a gear box having a plurality of gears, the sector gear being part of the plurality of gears and located in the gear box; and
a throttle body, wherein the gear box is connected to a throttle body.

14. The integrally formed sector gear of claim 13, the throttle body further comprising:
a housing portion, the bearing boss integrally formed as part of the housing portion;
a port formed as part of the housing portion;
the shaft extending through the housing portion such that a portion of the shaft is disposed in the port, and a portion of the shaft is connected to and rotated by the insert; and
a valve mounted to the shaft such that the valve is disposed in the port;
wherein the plurality of gears are used for rotating the shaft and changing the valve between an open position, a closed position, and any position there between.

15. The integrally formed sector gear of claim 12, the sector gear further comprising:
a first section where material has been removed; and
a second section where material has been removed, wherein each of the first arm and the second arm extend through one of the first section or the second section when the insert is formed with the sector gear and the first bushing.

16. The integrally formed sector gear of claim 15, wherein the first arm extends through the first section, and the second arm extends through the second section when the insert and the sector gear are configured in the left-hand configuration.

17. The integrally formed sector gear of claim 15, wherein the first arm extends through the second section, and the second arm extends through the first section when the insert and the sector gear are configured in the right-hand configuration.

18. The integrally formed sector gear of claim 12, wherein the second arm is shorter than the first arm.

19. An integrally formed sector gear, comprising:
a sector gear;
a first bushing integrally formed with the sector gear;
an insert, the first bushing and the sector gear integrally formed around at least two surfaces of the insert;
a ridge integrally formed with the gear member, the ridge substantially circumscribing the first bushing, the outer diameter of the ridge being larger than the outer diameter of the first bushing;
a groove integrally formed with the gear member such that the ridge is substantially circumscribed by the groove;
a spring in contact with the ridge formed as part of the gear member;
a second bushing, the spring in contact with a portion of the second bushing;
a bearing boss, the second bushing mounted to the bearing boss;
a first arm formed as part of the insert;
a second arm formed as part of the insert;
a first section formed as part of the gear member;
a second section formed as part of the gear member; and
a shaft, the insert mounted on the shaft such that shaft rotates as the sector gear, the first bushing, and the insert are rotated;
wherein the spring partially surrounds the first bushing and partially surrounds the second bushing, the first bushing and sector gear are integrally formed with the insert such that the position of the insert relative to the first bushing in a right-hand configuration is different than the position of the insert relative to the first bushing in a left-hand configuration, and the first arm extends through the second section and the second arm extends through the first section in the right-hand configuration, or the first bushing and sector gear are integrally formed with the insert such that the first arm extends through the first section, and the second arm extends through the second section in the left-hand configuration.

20. The integrally formed sector gear of claim 19, wherein the sector gear is used as part of a throttle body.

21. The integrally formed sector gear of claim 20, the throttle body further comprising:
- a housing portion, the bearing boss integrally formed as part of the housing portion;
- a port formed as part of the housing portion;
- a gear box having a plurality of gears such that the sector gear is one of the plurality of gears, the gear box connected to the housing portion;
- the shaft extending through the housing portion such that a portion of the shaft is disposed in the port, and a portion of the shaft is connected to and rotated by the insert; and
- a plate mounted to the shaft such that the plate is disposed in the port;
- wherein as the shaft is rotated, the plate is moved between an open position and a closed position.

22. The integrally formed sector gear of claim 19, wherein the second arm is shorter than the first arm.

* * * * *